United States Patent [19]

Boudrot

[11] Patent Number: 4,714,366

[45] Date of Patent: Dec. 22, 1987

[54] LOOSE-LEAF DOCUMENT BINDER

[76] Inventor: John E. Boudrot, 216 College Farm Rd., Waltham, Mass. 02154

[21] Appl. No.: 863,574

[22] Filed: May 15, 1986

[51] Int. Cl.[4] .......................... B42F 3/00; B42F 11/00; F16B 21/00; F16B 21/12

[52] U.S. Cl. .......................................... 402/13; 402/9; 411/340; 411/346

[58] Field of Search ....................... 402/6, 7, 9, 13, 46, 402/60, 64, 66, 69; 411/340, 341, 342, 343, 344, 345, 346

[56] References Cited

U.S. PATENT DOCUMENTS

| | | | |
|---|---|---|---|
| 708,102 | 9/1902 | Waldo, Jr. | 402/13 |
| 877,478 | 1/1898 | Barnard | 402/13 |
| 1,036,858 | 8/1912 | Kennedy | 411/345 |
| 2,203,146 | 6/0940 | Hexdall | 411/344 |
| 2,567,372 | 9/1951 | Gelpcke | 411/342 |
| 2,641,261 | 6/1953 | Uthurriague | 402/9 |
| 3,513,746 | 5/1970 | Forsberg | 411/346 |
| 4,318,651 | 3/1982 | Ragen | 411/342 |
| 4,432,683 | 2/1984 | Polos | 411/340 |

*Primary Examiner*—Paul A. Bell
*Assistant Examiner*—Paul M. Heyrana, Sr.
*Attorney, Agent, or Firm*—Robert T. Dunn

[57] ABSTRACT

Individual fasteners are provided for each of several pre-determined holes along a margin of pages of a document for securing the pages together at the holes, each fastener including: a relatively rigid cylindrical insert having a head at one end, the diameter of the insert cylinder being less than the diameter of the holes in the page and the diameter of the head being greater than the diameter of the holes; an elastic member such as a rubber elastic extending from the insert to a bar and attached to the center of the bar, the length of the insert cylinder being less than the minimum thickness of pages to be bound by the fastener and the length of the cylinder plus the length of the bar being greater than the maximum thickness of pages to be bound by the fastener. The fastener is first oriented with the bar extending lengthwise from the end of the cylinder so that it can be inserted into the hole through the document pages, the bar end first; then the extending end of the bar that emerges from the other side of the hole is pulled through the hole by stretching the elastic until the bar fully emerges; and then the bar is turned sideways (transverse) to the axis of the cylinder and released. When the bar is released, the document pages are then held between the head and the bar which are urged together by the elastic holding the pages firmly together. The force of the elastic is not so great as to prevent the document from being opened to any page and laid flat on a table with the elastic stretched between the pages the document is opened to.

19 Claims, 28 Drawing Figures

BRASS PAPER FAST

CUFF LINK

BLIND HOLE FAST

LOOSE-LEAF DOCUMENT BINDER

BACKGROUND OF THE INVENTION

The present invention relates to loose-leaf binders and holders for loose filing sheets and in particular to a clasp element for holding sheets at two or more holes along a margin so that they are bound together firmly for ready use and referral as a document and which permits removing and/replacing sheets of the document from time to time.

Heretofore a common holder for loose-leaf pages that are punched with holes along one margin is the multiple ring loose-leaf folder which includes two or more rings (a ring for each hole in the margin of the pages) that are mechanically connected together so that the rings can be opened and closed together. The rings are of fixed diameter and attached together within a heavy folder and snap open and close together and so with such multiple ring loose-leaf folders it is relatively easy to load and unload pages in the folder. The typical multiple ring folder of this sort provides a document holder to which pages may be added and so the thickness of the document may increase until the rings are full and can hold no more pages. A disadvantage of this kind of holder is that the holder thickness is fixed and, as a result, whether it contains a few pages or many pages, it occupies the same space on a bookshelf. An advantage is that the folder can be laid flat on a table and opened to any page and, as opened, lays flat so that two consecutive pages are fully in view and lay flat for reading or referral. This feature is particularly desirable when the document contained in the loose-leaf folder is used in conjunction with plans, drawings, etc. and will lay flat at any page it is turned to and does not have to be held open by the user at the desired page. Another disadvantage of the multiple ring folder is that it is relatively expensive and is not usually used when providing many copies of a document that are used for a short time and then discarded after a few weeks or months, such as a document of building specifications.

Another type of binder that avoids some of these limitations and disadvantages of the multiple ring binder is the plastic binding element. Before binding with the plastic binding element, the sheets of the document are usually punched with a multitude of evenly spaced rectangular shaped holes along one margin. As binding, a great number of plastic rings are fed through these holes using a special tool. The plastic rings are usually individual rings all the same diameter and each is formed by two overlapping arms extending from a common spine. The special tool is used to insert the rings through the holes in the pages in the document and once so inserted, the rings are not easily removed and often require use of the tool, which may be the same tool or another tool, to remove the rings so that pages can be replaced or exchanged in the document and then the document is bound up again.

The diameter of the rings of the plastic binding element is usually selected in view of the thickness of the document and so if a number of pages are added to the document, a larger diameter plastic binding element must be used. An advantage gained using the plastic binding element is that the thickness of the document need be no greater than the thickness of the pages of the document. In other words the diameter of the plastic rings can be selected so that it is only slightly larger than the thickness of the document and it will serve adequately. Then, the document need occupy no more space on a shelf than dictated by its thickness.

Another advantage of the plastic binding element is that the document it binds may be open to any page and laid flat on a table and will remain open at the page. It shares this advantage with the multiple ring folder. A disadvantage is clearly that special tools must be used to insert and to open the plastic binding element to add or replace pages in the document.

Another type of loose-leaf binder is the post and holder type which may consist simply of individual screw posts, one for each hole along a margin of the sheets that are bound. In a more elaborate form the post and holder type binder includes folders, one for carrying the posts and the other for carrying the holders. In all of these, the posts enter the holes in a stack of sheets from one side and either emerge from the other side or are contacted therein by a holder from the other side. For the simple screw posts, the post is equipped to receive either a nut or screw that enters or contacts it from the other side of the stack of papers and so secures the papers together.

There are many forms of folders with posts and holders. Some are of adjustable thickness and others are of fixed thickness. One conventional post and holder type binder is known as the Acco binder that consists of two posts rising from a flat piece that enter the holes through a stack of sheets on one side of the stack and emerge from the other side. The holder is mounted to the emerging posts and slides over them to the thickness of the stack of sheets and then the portions of the posts beyond the holder are bent and secured. An advantage of the Acco type of post and holder binder is that it can be adjusted to the thickness of the document and it can be closed and opened without tools to remove and/replace sheets in the document. However, it is intrinsic with all post and holder type of binders that the document bound cannot be opened to any page and folded flat on a table. Furthermore, a relatively large margin must be left along the bound edge of the pages, because the document cannot be opened so as to fully expose a whole page. The post and holder binder prevents prevents this.

OBJECTS AND SUMMARY OF THE INVENTION

It is an object of the present invention to provide a relatively simple fastener for fastening together pages punched with several pre-determined holes along one margin and to bind the pages together into a document having none of the disadvantages or limitations of prior devices for fastening and binding such pages of a document.

It is another object of the present invention to provide a simple fastener for fastening together pages punched with several pre-determined holes along one margin to bind the pages together into a document: the fasteners being easily removeable so that pages can be removed and added; the thickness of the bound document need be no thicker than the pages; and the document can be opened at any page and spread flat on a table.

It is another object of the present invention to provide an improved fastener for fastening together pages punched with several pre-determined holes along one margin and so bind the pages together into a document.

According to the present invention, individual fasteners are provided for each of several pre-determined holes along a margin of pages of a document for securing the pages together at the holes, each fastener including a relatively rigid cylindrical insert having a head at one end, the diameter of the cylinder being less than the diameter of the pre-determined holes in the page and the diameter of the head being greater than the diameter of the pre-determined holes. An elastic member, such as a rubber elastic, extends from the insert to a bar and is attached to the center of the bar, the length of the insert cylinder being less than the minimum thickness of the document to be bound by the fastener and the length of the cylinder plus the length of the bar being greater than the maximum thickness of the document to be bound by the fastener. The fastener is first oriented with the bar extending lengthwise from the end of the insert cylinder and then inserted into the hole through the document stack of pages, the bar end first; then the extending end of the bar that emerges from the other side of the hole is pulled through the hole by stretching the elastic until the bar fully emerges; and then the bar is turned sideways (transverse) to the axis of the cylinder and released. When the bar is released the document stack of pages are then held between the head and the bar which are urged together by the elastic. The force of the elastic is sufficient to hold the pages firmly together. At the same time, however, the force of the elastic is not so great as to prevent the document from being opened to any page and laid flat on a table with the elastic stretched between the pages the document is opened to.

Clearly, in order to remove or replace pages in the document it is only necessary for the user to take hold of the bar, pull it away from the document stretching the elastic, turn the bar parallel to the axis of the insert cylinder and release the bar back into the hole through the pages. Then the entire fastener can be removed from the other side of the pages. When each of the fasteners is so removed, pages can be added or replaced in the document and the fasteners again inserted as described to bind the document again.

Other objects and features of the present invention will be apparent to those skilled in the art in view of the following description of embodiments of the invention taken in conjunction with the drawings.

DESCRIPTION OF THE DRAWINGS

FIG. 11 is a cross-section view taken through one of the fastening holes in a stack of sheets bound as a document showing the action of a fastener according to the present invention of the type having a rubber elastic as the elastic element thereof of which: FIG. 11 shows the document open and laid flat at a page near the front part thereof.

FIGS. 14 to 17 show another embodiment of the fastener according to the present invention including a rubber elastic in which the elastic is a closed band that is easily attached to the insert and bar and so can be changed, of which: FIG. 14 is a side view with the elastic retracted, FIGS. 15 and 16 are front and side views, respectively, with the bar inserted into the end of the insert cylinder, and FIG. 17 is an end (bottom) view of the insert cylinder; and FIGS. 18 to 23 show another embodiment of the fastener including an elastic band that is easily attached to the insert and bar and so can be changed, of which: FIG. 18 is a front view with the bar inserted into the end of the insert cylinder, FIGS. 19 and 20 are front and side views, respectively, of the bar and hook, Figure is a bottom view of the insert, and FIGS. 22 and 23 are front and side views, respectively, of the insert; and FIGS. 24 through 28 show prior art fasteners for fastening two or more sheets or plates of material together to thereby bind them together as examples of prior art bearing some similarities to the present invention, of which FIG. 24 shows the conventional brass paper fastener, FIGS. 25 and 26 are two views showing a conventional cuff-link fastener and FIGS. 27 and 28 are two views showing steps of installation of the blind hole fastener sometimes used to fasten two boards together or to fasten an item to a stiff wall at a hole through the wall.

EMBODIMENTS OF THE INVENTION

Several embodiments of binders or fasteners according to the present invention is shown in FIGS. 1 to 23.

Rubber Elastic

Figure 1:
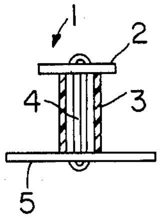
FIG. 1 is a side cross-section view of a single fastener according to the present invention including a rubber elastic as the elastic element thereof.
Figure 2:
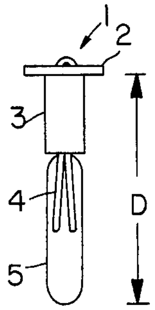
FIG. 2 is a front view of the same fastener.
Figure 3:
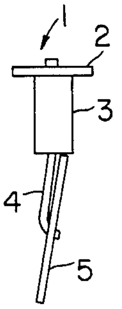
FIG. 3 is a side view of the same fastener.

FIGS. 1 to 3 show a fastener wherein the elastic element is a rubber elastic. As shown in FIG. 1 the fastener includes a cylindrical insert member 1 that is rigid and hollow and may be made of plastic or metal and includes a head 2 at one end from which extends a hollow cylinder 3. The length of the hollow tube is no longer than the finished document to be bound using the fastener. Contained within the tube and attached to the head on the inside of the tube is an elastic member which in this case is a rubber elastic 4. FIG. 1 shows the elastic in its retracted state extending down through the hollow tube to the open end thereof where it attaches to a transverse bar 5 at the center of the bar. Bar 5 may be made of metal, plastic or wood, the preferred material for both the rivet shaped portion and the bar being plastic, inasmuch plastic is relatively light weight and of sufficient strength to perform as described herein.

FIG. 2 is a front view showing the bar withdrawn and the elastic stretched so that one end of the bar projects slightly into the open end of the hollow tube of the insert cylinder. FIG. 3 shows a side view with the bar withdrawn in the same way. According to the present invention, the length of the bar plus the length of the hollow tube of the cylindrical insert from its open end to the inside of head 2, shown in FIGS. 2 and 3 as the total dimension D, is preferably greater than the thickest document to be bound with the fastener. The reason for this will be seen from the description herein of the steps for installing the fasteners and then using the document bound by such fasteners.

Replaceable Rubber Band

Other embodiments of the fastener according to the present invention are illustrated in FIGS. 14 to 23. In these, the cylindrical insert and the bar are adapted for easy attachment of a conventional rubber band. The attachment is such that the band can be removed and replaced. This might be done when the band breaks or if the user wanted to change the band and replace it with a band of different size or weight.

Figure 14:
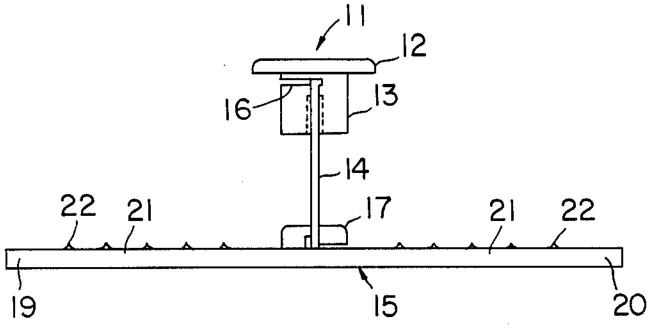
Figure 17:
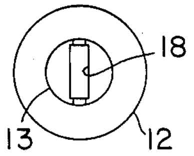
Figure 16:
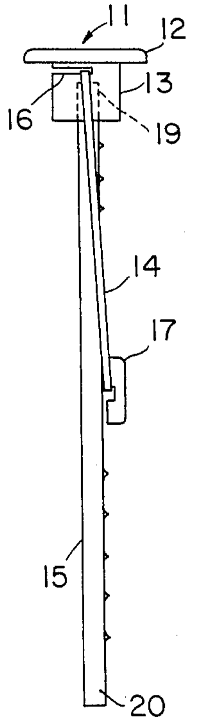

An embodiment of this kind is shown in FIGS. 14 to 17. Here, the fastener includes a cylindrical insert member 11 that is rigid and may be made of plastic or metal and includes a head 12 at one end from which extends a cylinder 13. The length of the cylinder is no longer than the finished document to be bound using the fastener. A transverse groove or slit 16 receives one end of elastic band 14. FIG. 14 shows the elastic in its retracted state extending down to a hook 17 at the center of transverse bar 15. Bar 15 may be made of metal, plastic or wood, the preferred material for both the insert and the bar being plastic, inasmuch plastic is relatively light weight and of sufficient strength to perform as described herein.

Figure 15:
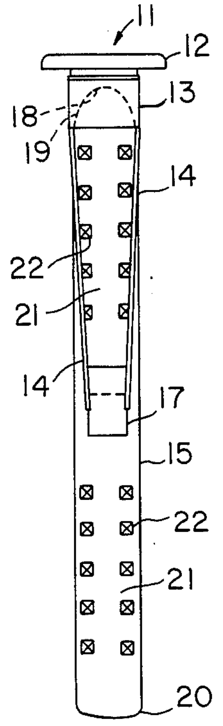

FIGS. 14 and 15 are front and side views, respectively, showing the bar withdrawn and the elastic stretched so that one end of the bar inserts into an accommodating recess 18 that extends axially into the cylinder. The end 19 of the bar and recess 18 have matching shapes, whereas the other end 20 of the bar has a different shape so that it will not fit in recess 18. This is to insure that only end 19 is inserted into the recess. If end 20 were inserted, elastic band 14 would come off hook 17.

The face 21 of bar 15 presses against the outside sheet of the document, which may be the top or the bottom sheet depending on which side the document the fastener is inserted. Face 21 may be textured to resist slipping on the page it is against. For example, it may have slight protuberances like 22 on face 21 to resist slipping.

Another embodiment of this type is shown in FIGS. 18 to 23. Here also, the fastener includes a cylindrical insert member 31 that is rigid and may be made of plastic or metal and includes a head 32 at one end from which extends a cylinder 33, the length of the cylinder being no longer than the finished document to be bound using the fastener. A transverse groove or slit 36 receives one end of elastic band 34 which turns downward toward bar 35 and lays in longitudinal grooves 43 and 44 on either side of the cylinder.

Figure 18:
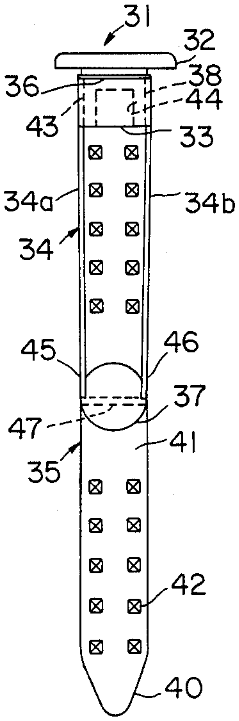

FIG. 18 shows the elastic slightly stretched to hook 37 at the center of the bar 35 which is oriented coextensive with the cylinder and has an end 39 inserted into corresponding recess 38 in the cylinder. The end 39 of the bar and recess 38 have matching shapes, whereas the other end 40 of the bar has a different shape so that it will not fit in recess 38. As in the previous embodiment, this is to insure that only end 39 is inserted into the recess; if end 40 were inserted, elastic band 34 would come off hook 37.

Figure 19:
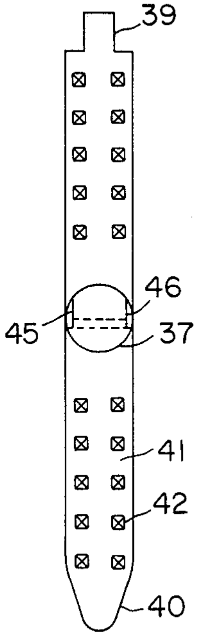
Figure 20:
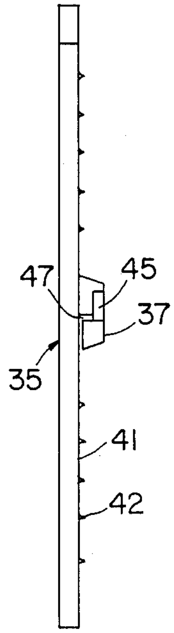
Figure 21:
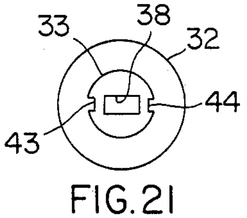
Figure 22:
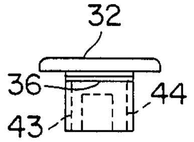
Figure 23:
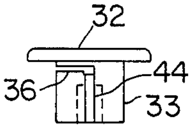

Here hook 37 is round as viewed in FIGS. 18 and 19 and the same diameter as cylinder 33 so that it fits into the hole in the document on the bar side thereof just as the cylinder fits in the hole on the insert side. In addition, hook 37 is slightly grooved by grooves 45 and 46 on either side, parallel with the edges of the bar to accomodate elastic band 34. As shown in FIG. 18, elastic band 34 crosses hook 37 at 47, lays in grooves 45 and 46 on either side of the hook, extends upward parallel and aligned with the edges of the bar, into cylinder grooves 43 and 44 and across again in cylinder slot 36.

With these adaptions of the insert 31, bar 35 and hool 37, the elastic band strands 34*a* and 34*b* that extend between the insert and the bar hook are parallel at all times and separated slightly less than the diameter of the document hole. The grooves 43 and 44 in the cylinder and grooves 45 and 46 in the hook secure the ends of the elastic band to the insert cylinder and to the bar hook for all positions and while the fastener is attached to the document.

As in previous embodiment, the face 41 of bar 35 presses against the outside sheet of the document and may be textured to resist slipping on the page it is against. For example, it may have slight protuberances like 42 on face 41 to resist slipping.

According to all embodiments of the present invention, the length of the bar plus the length of the cylinder, the total dimension D, is preferably greater than the thickest document to be bound with the fastener

Coil Spring Elastic

Figure 4:
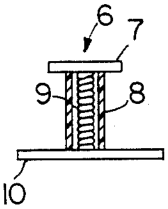
FIG. 4 is a side sectional view of a single fastener according to the present invention including a coil spring as the elastic element thereof.
Figure 5:
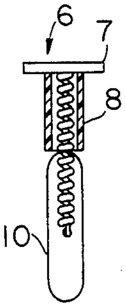
FIG. 5 is a front view of the fastener in FIG. 4.
Figure 6:
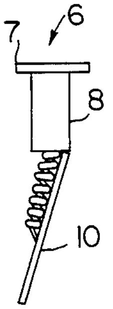
FIG. 6 is a side view of the fastener in FIG. 4.

Another embodiment of a similar fastener is illustrated by FIGS. 4 to 6. It is essentially the same as the fastener shown in FIGS. 1 to 3 except that the elastic element is a coil spring. In FIG. 4 the rivet shaped part 6 includes a head 7 at one end from which extends a hollow tube 8 and contained within the tube and attached to the head end thereof is a coil spring 9, shown in its retracted state and extending to the open end of the tube where it attaches to the center of bar 10. FIGS. 5 and 6 show front and side views of this fastener with the bar pulled down stretching the coil springs slightly and one end of the bar inserted briefly into the open end of the tube. In this orientation the fastener is ready for insertion into a hole through a stack of papers to bind the papers together.

Method Of Using

Clearly, several fasteners of the type shown in any of the embodiments described hereinabove are used to bind a stack of papers together to form a document. At least two such fasteners are used and preferably three mounted in equally spaced holes along one margin of pages of the document and when the document is so formed the thickness of the document is no greater than the stack of pages. Furthermore, as pages are added to or deleted from the document its thickness increases or decreases accordingly.

Figure 7:
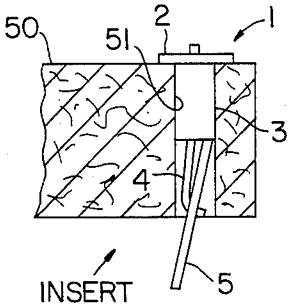
FIGS. 7, 8, 9 and 10 are side cross-section views taken through a hole in a stack of sheets of paper showing sequential steps of installing a fastener according to the present invention of the type having a rubber elastic as the elastic element thereof.
Figure 8:
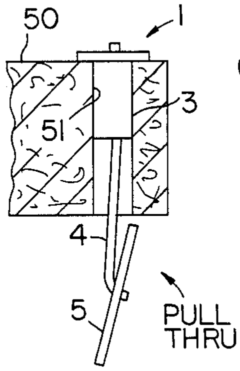

The steps in using and securing such a fastener to a stack of pages to bind the pages together are illustrated in FIGS. 7 through 10. These show the steps to attach the fastener of FIGS. 1 to 3. First, the fastener is adjusted as shown in, for example, FIGS. 2 and 3 so that it is ready for insertion into a hole through a stack of papers. FIG. 7 shows the adjusted fastener inserted through hole 51 in a stack 50 of papers. FIG. 8 shows the next step performed by the user who takes hold of the extending end of the bar 5 on the other side of the hole 51 and pulls the entire bar clear of the hole as shown in FIG. 8. Then the user turns the bar transverse to the elastic (or parallel to the sheets of paper) and releases it to the position shown in FIGS. 9 and 10.

Figure 9:
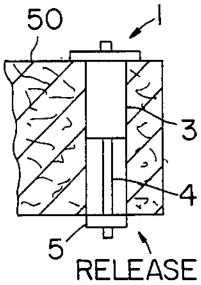
Figure 10:
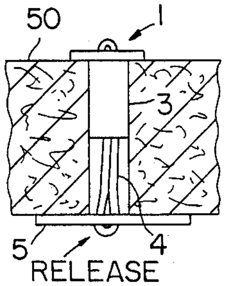

FIG. 9 is the same view as shown in FIGS. 7 and 8 and FIG. 10 is the transverse view. As shown in FIG.

10 the stack of papers are securely held between the bar and the head of the cylindrical insert as they are urged together by the elastic. This process is repeated at at least one other hole through the pages and preferably at at least three holes to firmly secure the pages together as a document. With several such fasteners attached along a margin of the pages the elastics, in effect, hold the pages tightly together sufficiently secure for ordinary use.

One of the uses that is allowed with a fastener according to the present invention is clearly that the fasteners may be removed by performing the steps described above in reverse and then extracting the fasteners so that pages can be replaced or added to the document.

Figure 11:
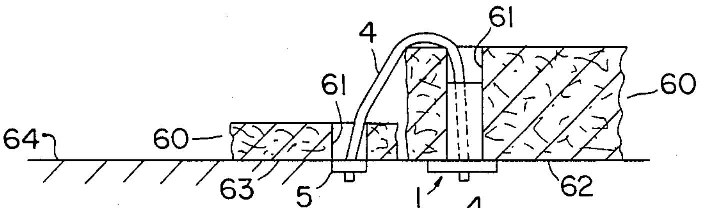
Figure 12:
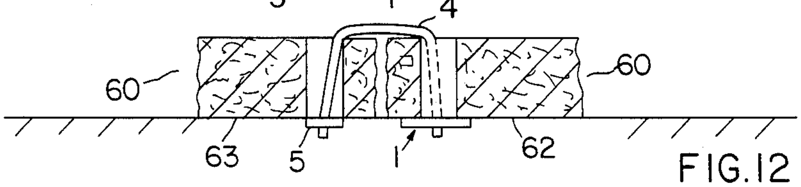
FIG. 12 shows the same document open and laid flat at a page near the middle thereof and FIG. 13 shows the document open and laid flat at a page near the end thereof.
Figure 13:
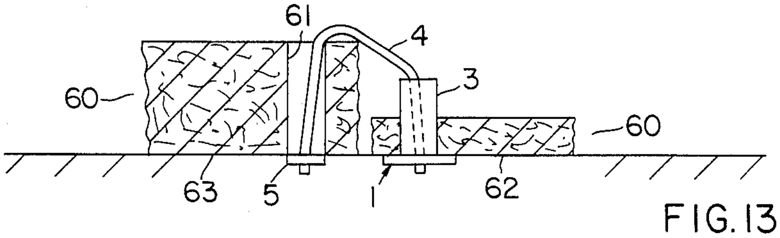

Another advantage gained by using fasteners according to the present invention is that the document may be opened at any page, either the beginning, middle or end of the document and laid flat on a table. This feature is illustrated by FIGS. 11, 12 and 13. FIG. 11 is a cross-section view through a hole 61 through the document 60 pages showing a fastener (of the kind illustrated by FIGS. 1 to 3) as viewed along the bound edge of the document and showing the document opened to a page near the end thereof and laid flat on the table 64. FIG. 12 is the same view of the document showing it opened at a page near the middle and laid flat on the table and FIG. 13 shows the document opened at a page near the beginning and laid flat on the table. Clearly, the fastener as shown in FIGS. 11 to 13 is inserted from the front or top page 62 of the document 60 and bar 5 is pulled through the last or bottom page 63. It should be equally clear and understood that the fastener may be inserted through the bottom page 63 and it will function just as well either way.

As illustrated in FIGS. 11 to 13, the document 60 bound with several such binders along a margin of the document can be opened to any page and laid flat on a table, because the elastic will stretch and permit this usage. Then, when the document is closed, the elastic retracts and firmly holds the pages together. Also the fasteners may all be removed and pages added or replaced, the fasteners reinserted and set and the document is ready for use again.

Thus, a relatively inexpensive simple fastener is provided that can be used in any number (two, three or more) along a margin of a document to hold together large numbers of pages and the fastener can be readily and easily removed to replace or add pages. Furthermore, in use, the document can be opened at any page and laid flat on a table without requiring the user to hold it for such use. A fastener according to the present invention provides all features of more expensive multiple ring folders and plastic binding elements that require special tools for attaching and removing the elements to add or replace pages to a document. In addition the document bound using the fasteners of the present invention is no thicker than the pages of the document and can be opened to any page and laid flat on a table and does not require it be held. Clearly, such is not the case for any of the post and holder type of binders described hereinabove.

Other Prior Art

Figure 24:
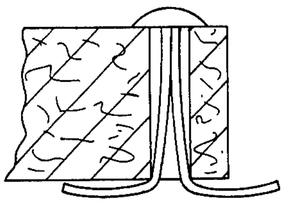
FIG. 24 PRIOR ART

Other conventional prior art binders bearing some similarity to the fasteners of the present invention are shown in FIGS. 24 through 28 and denoted "Prior Art". FIG. 24 shows the well-known brass paper fastener securing a stack of papers together through a hole through the papers. This fastener is a form of cotter pin and fixes the stack of papers together so that they cannot be opened, for example, to a middle page and laid flat on a table.

Figure 25:
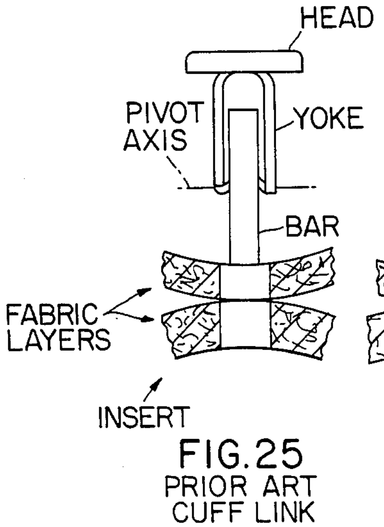
FIG. 25 PRIOR ART
Figure 26:
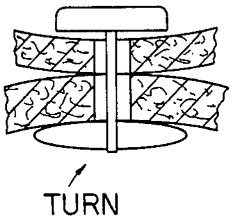

FIGS. 25 and 26 are two views of a conventional cuff-link inserted through overlapping parts of a sleeve with the holes therethrough aligned and then the bar of the cuff-link is turned on its yoke to secure the two parts of the cuff together.

Figure 27:
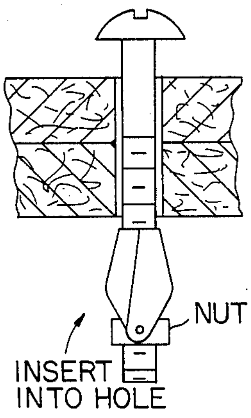
FIG. 27 PRIOR ART
Figure 28:
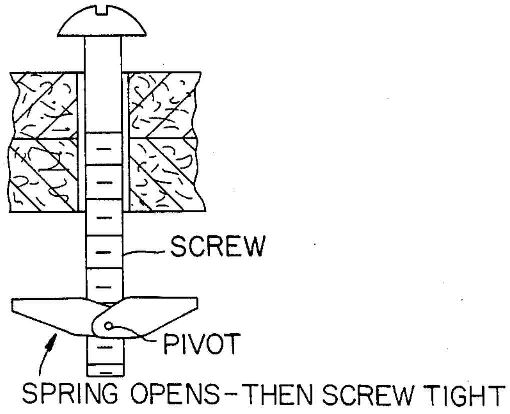

FIGS. 27 and 28 are two views of a conventional blind hole fastener including a bolt, a nut and two spring-loaded wings on the nut. In the folded position of this fastener shown in FIG. 27 it is inserted through a hole through two boards. Then, the wings are opened as shown in FIG. 28 and the bolt is screwed onto the nut securing the boards together between the nut wings and the bolt head.

CONCLUSIONS

The prior art devices described herein by description and reference are of interest, but none of those devices or the binders mentioned herein taken singly or in any combination anticipate the present invention as set forth more fully in the claims appended hereto.

What is claimed is:

1. A fastener device for holding together pages of a document by securing the pages of the document together at holes that align for all pages along one margin of the document, the holes in each page being the same pre-determined diameter and positioned with respect to the page margin comprising, (a) a relatively rigid cylindrical member having a head at one end, the diameter of the cylinder being less than the pre-determined diameter of the holes in the pages, and the head at one end being greater than said pre-determined diameter of the holes in the pages, (b) an elastic member extending from the opposite end of said cylinder and (c) a bar member that is attached at the center thereof to the extending end of said elastic member, (d) whereby the fastener device, oriented with one end of the bar against said opposite end of the cylinder so that the bar and the cylinder are substantially aligned with the bar extending from said opposite end of the cylinder, may be inserted, the bar end first, into one side of the document through the aligned holes in the pages of the document up to the inside of said head so that the bar emerges from the other side of the document through the aligned holes and the emerging end of the bar may be pulled through the document so that the bar fully emerges from said other side of the aligned holes, turned transverse to the elastic member, and released, whereupon the elastic member urges the bar and head together and so secures the document pages together.

2. A fastener device as in claim 1 wherein, (a) the length of the cylindrical member is less than the minimum thickness of the document to be bound by the fastener and (b) the length of the cylindrical member plus the length of the bar is greater than the maximum thickness of the document to be bound by the fastener.

3. A fastener device as in claim 1 wherein said elastic member is a rubber elastic.

4. A fastener device as in claim 3 wherein said elastic member includes several strands all of which attach at one end to said cylindrical member and at the other end to said bar member.

5. A fastener device as in claim 1 wherein said cylindrical member is hollow and said elastic member attaches at one end inside said hollow cylindrical member adjacent said head thereof and extends therefrom under tension from the open end of said cylindrical member to said bar member.

6. A fastener device as in claim 5 wherein, (a) said cylindrical member is a hollow cylinder from the open end thereof to the head thereof and (b) said elastic member is attached to said head thereof within said hollow cylinder.

7. A fastener device as in claim 6 wherein said elastic member is a continuous closed elastic (like an elastic band) and one end thereof loops over a portion of said head and the other end thereof loops over a portion of said bar.

8. A fastener device as in claim 7 wherein said elastic member in its retracted state is sufficiently long to reach from said head to said bar when said bar is oriented transverse to the axis of the said cylindrical member and is sufficiently resilient to stretch at least half the length of said bar from the open end of said cylindrical member.

9. A fastener device as in claim 8 wherein said bar is sufficiently rigid that when one end thereof is inserted into the open end of said cylindrical member placing said elastic member under tension, said tension is not sufficient to collapse said bar.

10. A fastener device as in claim 1 wherein said elastic member is a closed elastic band and said cylindrical member and said bar are each adapted to hook onto said elastic band.

11. A fastener as in claim 1 wherein said opposite end of said cylindrical member is adapted to receive an end of said bar.

12. A fastener device as in claim 1 wherein said elastic member is a coil spring.

13. A fastener device as in claim 1 wherein said elastic member is a closed elastic band and said cylindrical member and said bar are each adapted to hook onto said elastic band.

14. A fastener device as in claim 13 wherein said adaption of said bar includes a projection of which the axis is transverse to said bar and which fits into the aligned page holes, whereby said cylindrical member and said bar member projection fit into the aligned page holes at opposite ends thereof.

15. A method of binding together into a document loose leaf pages such having several pre-determined page holes along a page margin thereof so that when the pages are arranged in a stack, corresponding pre-determined page holes align defining several pre-determined document holes through the document along the page margin thereof including the steps of:

(a) inserting into each of the document holes separate devices each having a relatively rigid cylindrical member with a head at one end, the diameter of the cylinder being less than the pre-determined diameter of the document hole, and said head at one end being greater than the pre-determined diameter of the document hole, (b) from the opposite side of each document hole pulling a bar member that is attached at its center to an elastic member that extends from said cylindrical member in the document hole, clear of the document hole, (c) turning said bar member transverse to the document hole and (d) releasing said bar member to the force of said elastic member, (e) whereby said elastic member in each document hole urges said bar and head associated therewith together and so binds the pages of the document.

16. The method as in claim 15 including the additional step, preceding said step (c), of:

(f) orienting said cylindrical member and said bar so that they are coextensive, said bar extending from an end of said cylinder and the total length of said device is substantially equal to the length of said cylinder plus the length of said bar.

17. A fastener device for holding together pages of a document by securing the pages of the document together at holes of pre-determined diameter that align for all pages along one margin of the document comprising, (a) a first relatively rigid member having a dimension that is greater than the pre-determined diameter of the holes in the pages, (b) an elastic member attached to and extending from a point on said first member between the ends of said dimension thereof and (c) a second relatively rigid member having a dimension that is greater than the diameter of the holes in the pages and is attached at a point thereof between the ends of said dimension thereof to the extending end of said elastic member, (d) whereby said fastener device, oriented with one end of said first rigid member against said second rigid member and with said first member having its mentioned dimension coextensive with said elastic member, may be inserted into one side of the aligned holes in the pages of the document so that the inserted end of said first member emerges from the other side of the aligned holes and said emerging end may be pulled through the aligned holes so that said first member fully emerges from the other side of the aligned holes, turned transverse to said elastic member, and released, whereupon said elastic member urges said first and second members together with the pages in between and so secures the pages together.

18. A fastener device as in claim 17 wherein said elastic member is a rubber elastic.

19. A fastener device as in claim 18 wherein said elastic member includes several strands all of which attach at one end to said first member and at the other end to said second member.

* * * * *